United States Patent [19]

Ohta

[11] Patent Number: 5,051,614
[45] Date of Patent: Sep. 24, 1991

[54] DROPOUT DETECTING APPARATUS

[75] Inventor: Haruo Ohta, Yawata, Japan

[73] Assignee: Matsushita Electric Industrial Co., Ltd., Osaka, Japan

[21] Appl. No.: 356,322

[22] Filed: May 23, 1989

[30] Foreign Application Priority Data

May 26, 1988 [JP] Japan .............................. 63-128940

[51] Int. Cl.$^5$ ........................ H03K 5/00; H03K 5/153
[52] U.S. Cl. .................................... 307/350; 307/520; 307/529; 358/314; 358/336; 360/38.1
[58] Field of Search ............... 307/350, 362, 520, 529; 328/120, 150, 143, 144, 162, 163; 358/314, 336; 360/38.1

[56] References Cited

U.S. PATENT DOCUMENTS

| 3,328,755 | 6/1967 | Buell et al. | 328/144 |
| 4,088,960 | 5/1978 | Osborne | 328/144 |
| 4,585,961 | 4/1986 | Daubert | 328/144 |
| 4,634,988 | 1/1987 | Romeo, Jr. | 307/520 |
| 4,705,969 | 11/1987 | Gross | 328/144 |
| 4,757,390 | 7/1988 | Mehrgardt et al. | |

FOREIGN PATENT DOCUMENTS 0169930 2/1986 European Pat. Off. .
61-43083 3/1986 Japan .

OTHER PUBLICATIONS

*Digital Signal Processing in Video Tape Recorders;* IEEE Transactions on Consumer Electronics, vol. CE-31, No. 3, Aug. 1985; Sonke Mehrgardt; pp. 374–377.

*Primary Examiner*—John Zazworsky
*Attorney, Agent, or Firm*—Wenderoth, Lind & Ponack

[57] ABSTRACT

A dropout detecting apparatus comprises a phase conversion circuit for converting an input signal into two signals which are different in phase by $\pi/2$ from each other, two squaring circuits for obtaining squares of the two signals respectively, an addition circuit for adding the two square signals, and an amplitude comparator for comparing the amplitude of an output signal of the addition circuit with a reference value. The output signal of the addition circuit becomes the square of the envelope of the input signal regardless of the phase of the input signal.

4 Claims, 4 Drawing Sheets

DROPOUT DETECTING APPARATUS

BACKGROUND OF THE INVENTION

1. Field of the Invention

The present invention relates to a dropout detecting apparatus for detecting a dropout of a reproduced signal in a signal reproducing apparatus such as a video tape recorder (VTR) and the like.

2. Description of the Prior Art

It is necessary for a VTR to correct for a dropout of a reproduced signal caused by a defect of the magnetic tape. Accordingly, to detect the dropout, dropout detecting apparatus have been used.

Conventional dropout detecting apparatus in extensive use are so constructed that they rectify and smooth the reproduced FM (frequency modulation) signal to obtain an envelope, and detect an amplitude of the envelope which is smaller than a predetermined level as being a dropout.

However, with this construction, when the time constant for smoothing is made small so as to detect a short time dropout, the envelope comes to include ripples to give rise to an erroneous detection; and when the time constant is increased so as to prevent the erroneous detection, the detection of the short time dropout becomes impossible.

On the other hand, in recent years, there has been a movement to perform the signal processing in a VTR, which had hitherto been analog processing, by digital processing so as to expect rationalization or high performance of the circuit. (For example, IEEE, Trans. on Consumer Electronics, vol CE-31, No.3, August 1985, pp 374-377, Japanese Laid-open Patent Application No.61-43083, etc.) Accordingly, it is desired for the dropout detection to be realized by digital signal processing and to be suited to a semiconductor system.

SUMMARY OF THE INVENTION

Accordingly, it is an object of the present invention to provide a dropout detecting apparatus which can correctly detect even a short time dropout without utilizing the envelope obtained by rectifying and smoothing the reproduced signal.

Another object of the present invention is to provide a dropout detecting apparatus which can be realized by digital signal processing circuitry and is suited to a semiconductor system.

To attain the above objects, a dropout detecting apparatus of the present invention comprises a phase conversion means for converting an input signal into first and second signals which are different in phase by $\pi/2$ from each other; a first squaring means for squaring said first signal to obtain a first squared signal; a second squaring means for squaring said second signal to obtain a second squared signal; an adding means for adding said first and second squared signals to obtain a squared sum signal, and a comparison means for comparing an amplitude of said squared sum signal with a predetermined reference value to produce a dropout detection signal when said amplitude is smaller than said reference value.

DESCRIPTION OF THE PREFERRED EMBODIMENTS

Hereinafter, preferred embodiments of the dropout detecting apparatus of the present invention will be described. In the following embodiments, it is assumed that the signal inputted to the dropout detecting apparatus is an FM signal which is reproduced from a video tape and converted into a digital signal in a VTR, and all processing is effected in the form of digital signals.

Firstly, a first embodiment of the present invention will be described.

Figure 1:
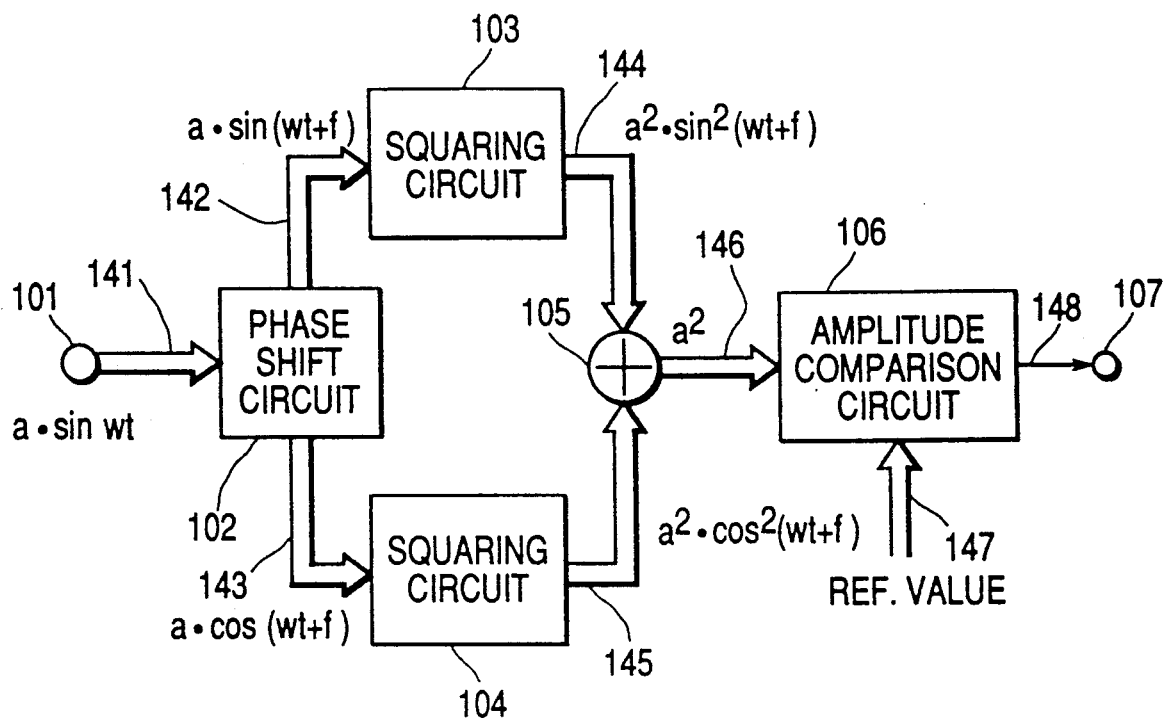
FIG. 1 is a block diagram showing a dropout detecting apparatus in accordance with a first embodiment of the present invention.

FIG. 1 is a block diagram showing a dropout detecting apparatus in accordance with the first embodiment of the present invention. In the drawing, the white bold lines denote signals composed of plural bits, and the fine lines denote signals of 1 bit. The reproduced FM signal has been converted by an A/D converter (not shown) into a digital signal, which is inputted through an input terminal 101 as a signal 141. The signal 141 is inputted into a phase shift circuit 102.

Figure 2:
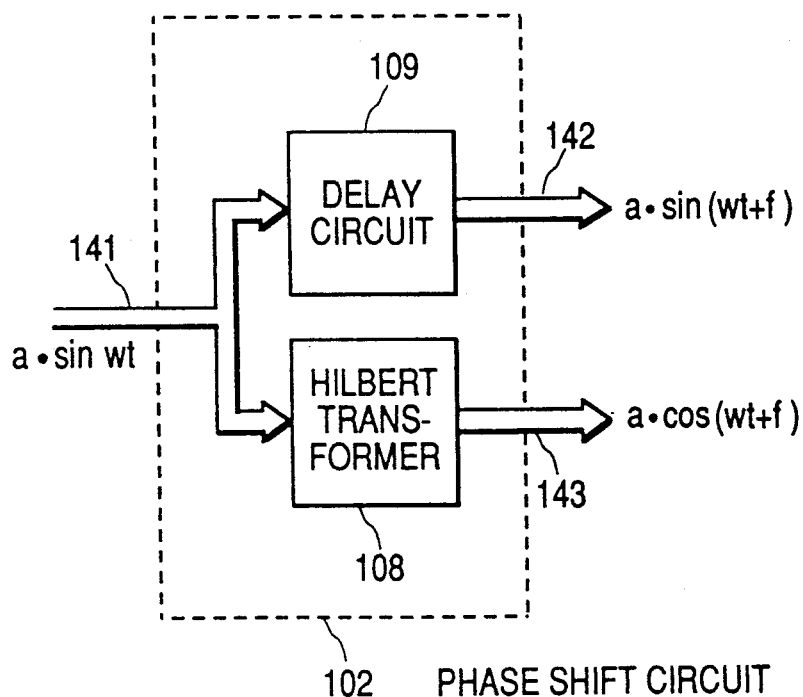
FIG. 2 is a block diagram showing a phase shift circuit (102) of the first embodiment of the present invention.

The phase shift circuit 102 is constructed, for example, as in FIG. 2. Referring to FIG. 2, the signal 141 is inputted into a Hilbert transformer 108 to be subjected to a Hilbert transform to become a Hilbert transformed signal 143. On the other hand, the signal 141 is delayed by a delay circuit 109 by the same period of time as a delay time $\delta$ generated in the Hilbert transformer 108 and outputted as a signal 142. Assuming that the signal 141 is represented as $a \cdot \sin(\omega t)$, then the signal 142 becomes $a \cdot \sin(\omega t + \delta)$ and the signal 143 becomes $a \cdot \cos(\omega t + \delta)$.

Referring back to FIG. 1, the signals 142 and 143 are inputted into squaring circuits 103 and 104, respectively. Each of the squaring circuits 103 and 104 is a circuit for outputting the square of the amplitude of the signal inputted thereto and may be readily constructed by, for example, a read-only memory (ROM). As a result, the output signal 144 of the squaring circuit 103 becomes $a^2 \cdot \sin^2(\omega t + \delta)$, and the output signal 145 of the squaring circuit 104 becomes $a^2 \cdot \cos^2(\omega t + \delta)$. The signals 144 and 145 are added together by an addition circuit 105 to form a signal 146.

In this case, the signal 146 becomes: $a^2 \cdot \sin^2(\omega t + \delta) + a^2 \cdot \cos^2(\omega t + \delta) = a^2$, representing the square of the envelope of the input signal 141. The square of the envelope is at all times accurately obtainable regardless of the phase $\omega t$ of the input signal 141.

The thus obtained signal 146 is inputted to an amplitude comparison circuit 106. In the amplitude comparison circuit 106, a comparison is made between the value represented by the signal 146 and a signal 147 representing a specified reference value, and the result of the comparison is outputted as a high level or low level signal 148. Here, the reference value is properly set such that it can be judged that a dropout has occurred when the value represented by the signal 146 which shows the square of the envelope of the input signal 141 is smaller than the reference value represented by the signal 147. Accordingly, the signal 148 which is the result of comparison is outputted from an output terminal 107 as a dropout detection signal.

As has already been made clear from the above description, according to this embodiment, the signals 146 always represents accurately the square of the envelope of the input signal 141 regardless of the phase of the input signal 141, and is compared with the specified reference value to identify the dropout. Accordingly, unlike the conventional embodiment, the detected envelope value does not involve ripples due to smoothing or erroneous detection. Furthermore, even a short time dropout can be accurately detected. Moreover, the apparatus is realized fully by a digital system, and is suited to a semiconductor system.

Next, a description of a second embodiment of the present invention is provided.

Figure 3:
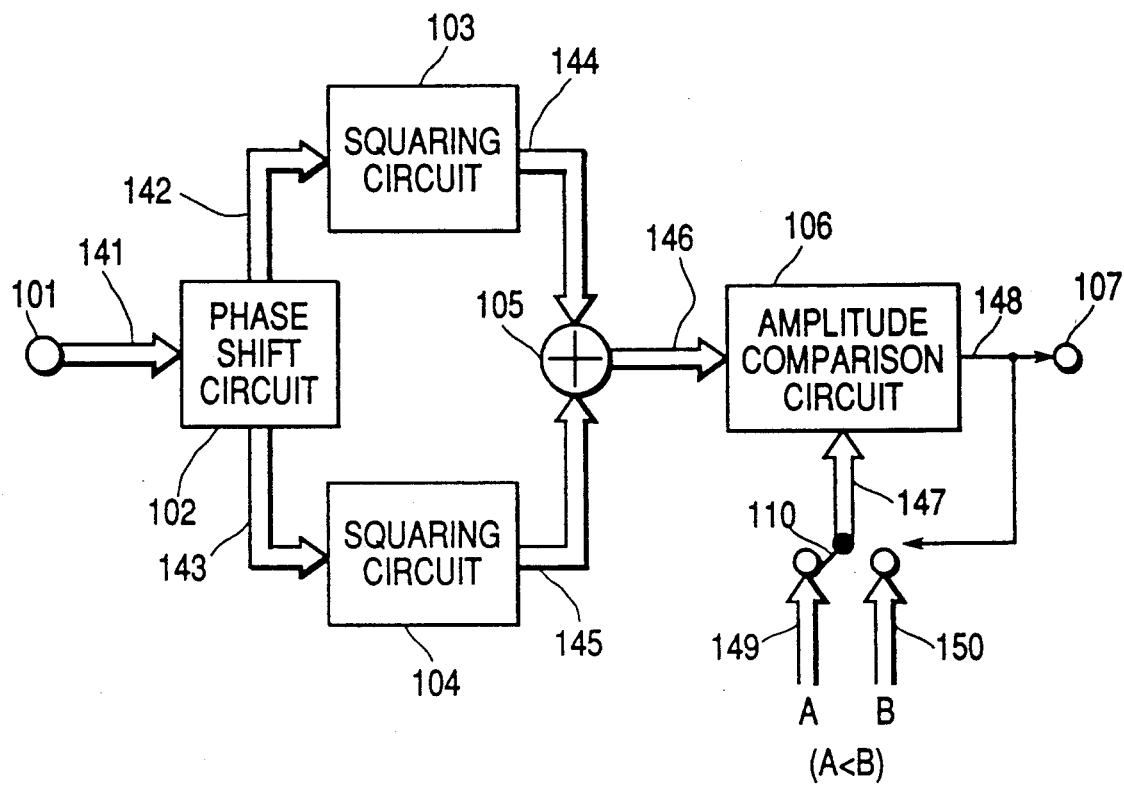
FIG. 3 is a block diagram showing a dropout detecting apparatus in accordance with a second embodiment of the present invention.

FIG. 3 is a block diagram showing the second embodiment of the dropout detecting apparatus of the present invention. The same numerical designations were affixed to the parts having the same functions as those of the first embodiment shown in FIG. 1. The signal 147 representing the reference value which is fed to the amplitude comparison circuit 106 is obtained from a signal 149 representing a first reference value or a signal 150 representing a second reference value via a selection circuit 110 for selecting either one of the two reference values. The selection circuit 110 is controlled by the signal 148.

Figure 4:
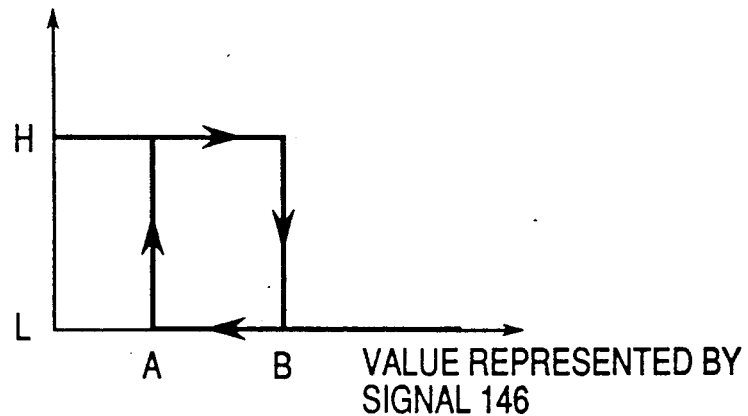
FIG. 4 is a diagram illustrating the operation of an amplitude comparing circuit (106) of the second embodiment of the present invention shown in FIG. 3.

Now, it is assumed that the state of the signal 148 when the value represented by the signal 146 is smaller than the value represented by the signal 147, i.e., when it is detecting a dropout, is a high (H) level, and the state of the signal 148 at any other time is a low (L) level. Also, it is assumed that when the signal 148 is at a H level, the selection circuit 110 selects the signal 150, and when the signal 148 is at an L level, the selection circuit 110 selects the signal 149. When the value represented by the signal 149 is A and the value represented by the signal 150 is B, A is set to be smaller than B. At this time, when the value represented by the signal 146 is shown on an abscissa and the state of the signal 148 on an ordinate, there is a characteristic of hysterisis as shown in FIG. 4.

As shown above, according to this embodiment, by changing the reference value 147 depending on the condition where the dropout is detected and the condition where it is not detected, a hysterisis characteristic can be imparted to the detection. As a result, an excellent effect can be obtained such that, for example, when a dropout is being detected, the detection result is not changed by a fluctuation of amplitude caused by noise or the like, and a stabilized detection can be carried out.

Next, a description of a third embodiment of the present invention is provided.

Figure 5:
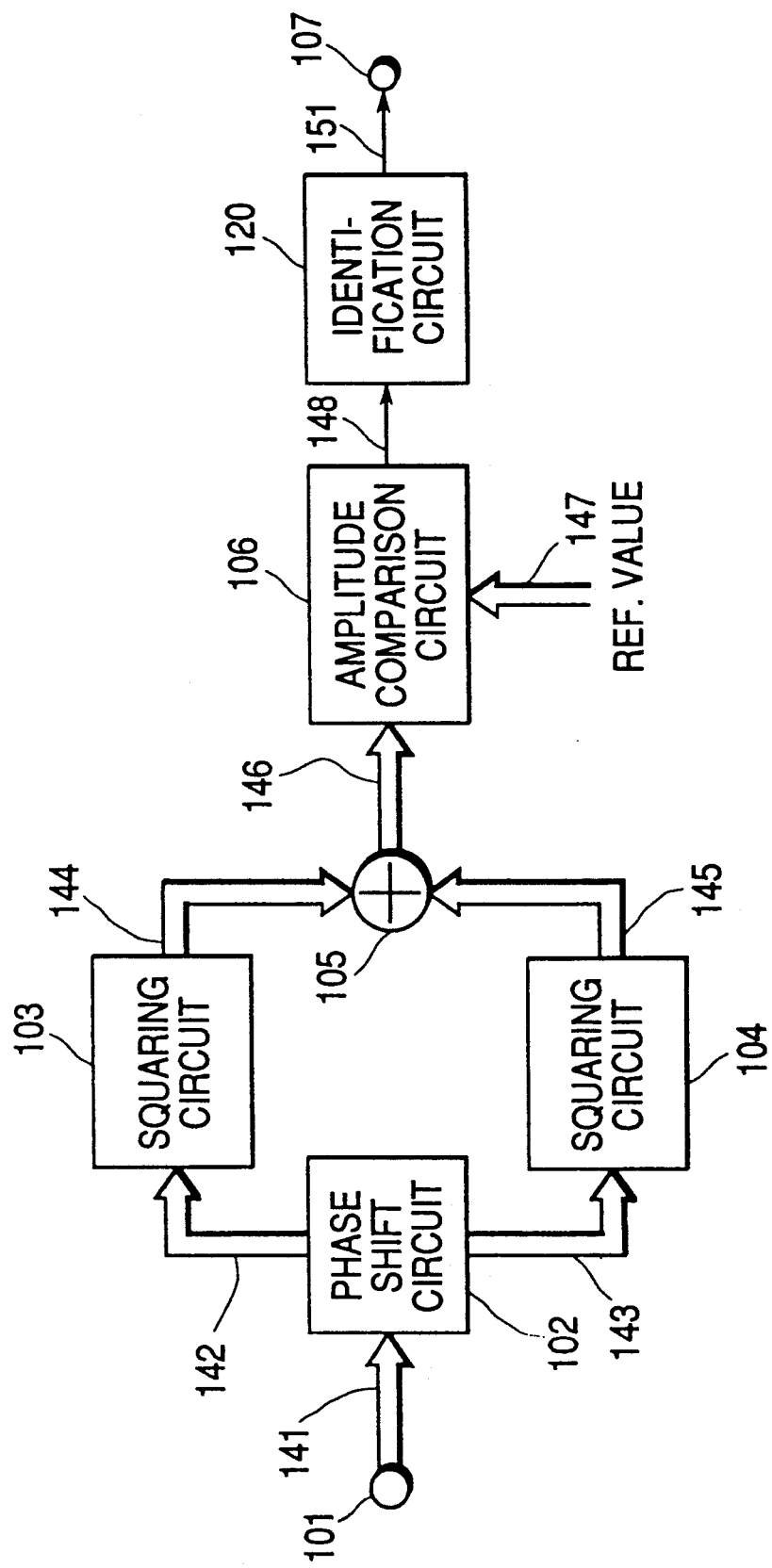
FIG. 5 is a block diagram showing a dropout detecting apparatus in accordance with a third embodiment of the present invention.

FIG. 5 is a block diagram showing the third embodiment of the dropout detecting apparatus of the present invention. The same numerical designations were affixed to the parts having the same functions as those of the first embodiment shown in FIG. 1. The difference of this embodiment from the first embodiment is that, in this embodiment it is so constructed that the signal 148, which shows the result of the comparison by the amplitude comparison circuit 106, is further passed through an identification circuit 120 and outputted as a dropout detecting signal 151 from the output terminal 107. As with FIG. 3, it is assumed that the signal 148 is a high level (H) when the amplitude of the signal 146 is smaller than the reference value 147, and is a low level (L) when the amplitude of the signal 146 is greater than or equal to the reference value 147.

Figure 6:
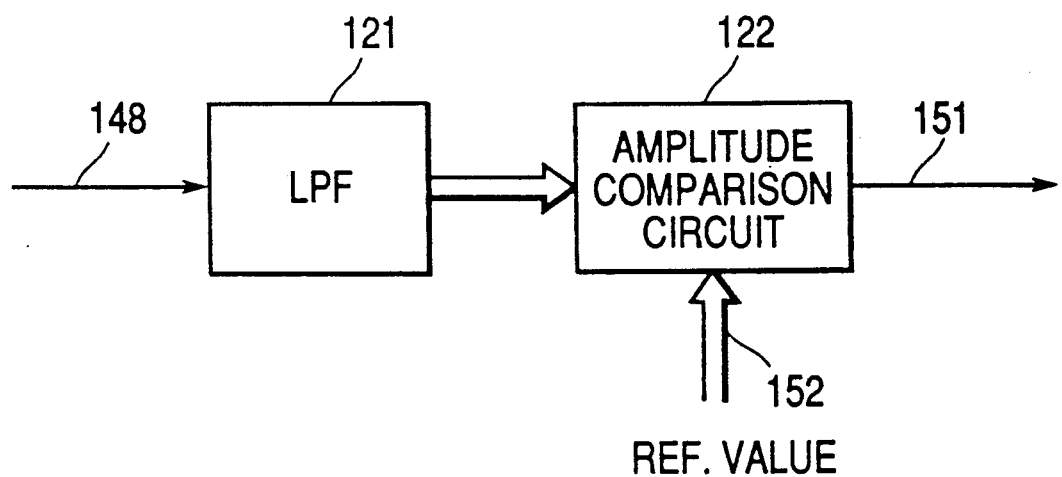
FIG. 6 and FIG. 7 are block diagrams each showing an identification circuit (120) of the third embodiment of the present invention shown in FIG. 5.

The identification circuit 120 is constituted, for example, as shown in FIG. 6. In FIG. 6, the signal 148 which shows the result of comparison is smoothed by a low-pass filter (LPF) 121. The smoothed signal is compared with a signal 152 which represents an identification reference value by an amplitude comparison circuit 122 to output the signal 151 which shows the occurrence of a dropout when the smoothed signal is larger than the reference value 152.

According to this embodiment, it is possible to eliminate erroneous detection which occurs in the signal 148 due to an instantaneous large amplitude fluctuation of the inputted FM signal caused by noise and the like, and to perform stabilized detection. Also, since the LPF 121 uses a 1 bit signal as an input, it can be realized in an extremely small scale circuit.

Figure 7:
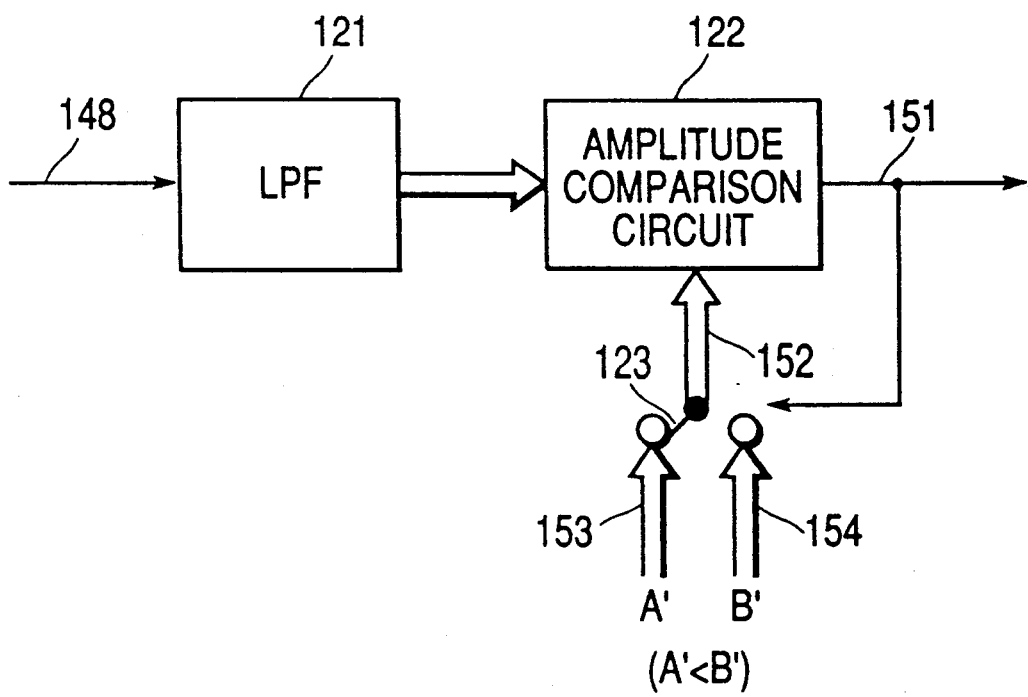

Alternatively, the identification circuit 120 may be constituted as shown in FIG. 7. That is to say, the signal 152 which represents the identification reference value in the amplitude comparison circuit 122 is obtained from a signal 153 which represents a first identification reference value or from a signal 154 which represents a second identification reference value via a selection circuit 123 for selecting either one of the two reference signals. The selection circuit 123 is controlled by the signal 151. By constituting a circuit as noted above, which is similar to the second embodiment, it is possible to impart a hysterisis characteristic to the identification, and as a result, even if the signal 148 which is the result of the comparison fluctuates due to noise having a large amplitude, stabilized detection can be performed without causing a fluctuation of the signal 151.

As described above, according to the present invention, the square of the envelope value of the input signal is obtained instantaneously regardless of the phase of the input signal, and the dropout detection is performed based on the square value, so that accurate detection is possible.

Further, the above construction can be readily realized by digital circuits, and is suitable to semiconductor systems.

It is to be noted that the present invention is not limited to the abovementioned embodiments but applicable to other construction and other objects insofar as they lie within the scope defined by the claim. For example, the reproducing apparatus may not be limited to a VTR, but may be a video disk player using a video disk as the recording medium.

What is claimed is:

1. A dropout detecting apparatus for detecting a dropout of an input signal, comprising:
   a phase conversion means for converting the input signal into first and second signals which are the same in amplitude and different in phase by $\pi/2$ from each other;
   a first squaring means for squaring said first signal to obtain a first squared signal;
   a second squaring means for squaring said second signal to obtain a second squared signal;

an addition means for adding said first and second squared signals to obtain a squared sum signal;

an amplitude comparison means for comparing an amplitude of said squared sum signal with a predetermined reference value to produce a dropout detection signal when the amplitude of said squared sum signal is smaller than said reference value; and a reference value varying means for varying said reference value according to an output signal of said amplitude comparison means.

2. An apparatus according to claim 1, wherein if the output signal of said amplitude comparison means is a high level, H, when the amplitude of said squared sum signal is smaller than said reference value, and is a low level, L, otherwise, then said reference value varying means sets said reference value to a first reference value when the output signal of said amplitude comparison means is at an L level and to a second reference value which is larger than said first reference value when the output signal of said amplitude comparison means is at an H level.

3. A dropout detecting apparatus for detecting a dropout of an input signal, comprising:

a phase conversion means for converting the input signal into first and second signals which are the same in amplitude and different in phase by $\pi/2$ from each other;

a first squaring means for squaring said first signal to obtain a first squared signal;

a second squaring means for squaring said second signal to obtain a second squared signal;

an addition means for adding said first and second squared signals to obtain a squared sum signal;

a first amplitude comparison means for comparing an amplitude of said squared sum signal with a predetermined reference value to produce a dropout detection signal when the amplitude of said squared sum signal is smaller than said reference value;

a smoothing means for smoothing said dropout detection signal; and a second amplitude comparison means for comparing an amplitude of an output signal of said smoothing means with a predetermined identification reference value to identify an occurrence of a dropout.

4. An apparatus according to claim 3, further comprising a reference value varying means for varying said identification reference value according to the output signal of said second amplitude comparison means.

* * * * *